Patented Aug. 24, 1926.

1,597,093

UNITED STATES PATENT OFFICE.

JOHN S. MALLOY, OF CENTERVILLE, IOWA, ASSIGNOR TO CENTERVILLE GYPSUM COMPANY, OF CENTERVILLE, IOWA, A CORPORATION OF IOWA.

INSULATING COMPOSITION.

No Drawing.  Application filed July 24, 1924.  Serial No. 727,994.

The purpose of my invention is to provide a composition of matter, which utilizes materials of such a kind and in such a manner that a minimum of treatment and handling of the materials is necessary.

A further object is to provide such an insulating material, which when mixed with water and permitted to dry will expand to approximately five times its volume in the dry mixture and form a product of heat insulating qualities, sound-proof and of substantial structural strength.

A further purpose is to provide such a composition, having as its principal ingredient, finely divided anhydrite, which product can be mixed in the factory and stored or transported to the place for use, where it can be completed to form blocks, sheets or the like, by simply mixing it with water and allowing it to dry.

With these and other objects in view, my invention consists in the composition of matter hereinafter more fully described and set forth in my claims.

My improved composition of matter consists of the following ingredients in substantially the proportions herein set forth.

| | |
|---|---|
| Finely divided anhydrite | 1200 pounds |
| Calcium sulphate hidrate form | 500 pounds |
| Equivalent magnesium carbonate, in limestone | 200 pounds |
| Aluminum sulphate | 175 pounds |
| Commercial retarder | 16 ounces |

The anhydrite is natural rock material, which contains no moisture and may be ground up and used without any process of calcining or dehydration. This makes it possible to use the material with a minimum of handling and treatment, so that the number of operations necessary are few and the expense of manufacture small.

The calcium sulphate, magnesium carbonate and aluminum sulphate are all mixed with the anhydrite in a finely divided state, produced by grinding or the like.

This product when completed and mixed may be shipped in the form of a powder, and on the job is mixed with water in substantially the proportions of ten quarts of water to twelve quarts of the mixture.

The mixture will then expand to five times its dry volume and can be formed into blocks, sheets or tiles, as may be desired, having a cellular structure of light weight and high heat insulation qualities.

The finished product is a very effective insulator against heat or cold and is entirely nonflammable and fire-proof. The product is also practically sound-proof.

It improves with age, having no ingredients which deteriorate or decay.

The finished mixture can be stored for a long time without deteriorating. It can be conveniently shipped to the point where it is to be used, and there mixed with water in substantially the proportions herein set forth, for making insulating blocks or sheets for walls, roofs and so on.

The product is of great strength and can be used for a great variety of purposes.

Insulation made in the manner above described and from the prescribed ingredients may be used for covering kilns, for walls, roofing and a great many characters of building construction.

The advantage of being able to mould or form the product in the desired form, on the job, by the simple addition of water is obvious.

I claim as my invention:—

1. A composition of matter, comprising finely divided anhydrite, finely divided calcium sulphate, pulverized magnesium carbonate, finely divided aluminum sulphate, and commercial retarder, in substantially the relative quantities of twelve hundred pounds, five hundred pounds, two hundred pounds, one hundred and seventy-five pounds and sixteen ounces.

2. A composition of matter, comprising finely divided anhydrite, finely divided calcium sulphate, pulverized magnesium carbonate, finely divided aluminum sulphate, and commercial retarder, in substantially the relative quantities of twelve hundred pounds, five hundred pounds, two hundred pounds, one hundred and seventy-five pounds, and sixteen ounces, and water.

Des Moines, Iowa, July 16, 1924.

JOHN S. MALLOY.